Aug. 20, 1957 G. E. PFISTERER 2,803,469
COLLAPSIBLE GOLF CART
Filed Dec. 14, 1954 3 Sheets-Sheet 1
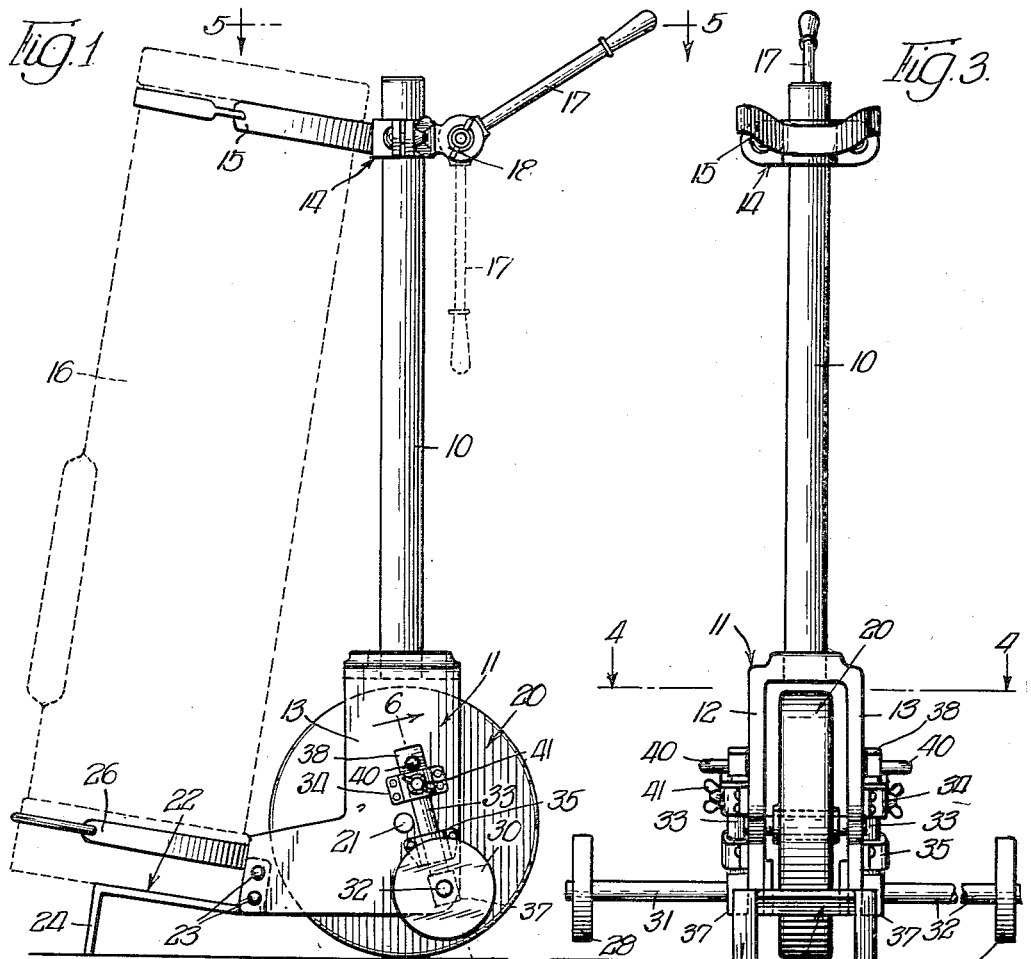
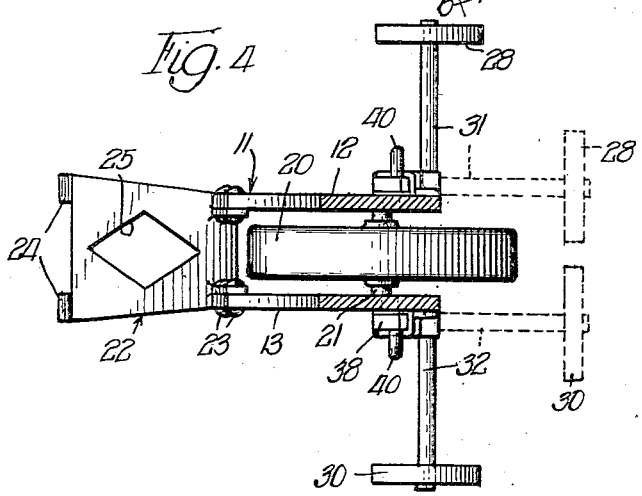
INVENTOR.
George E. Pfisterer,
BY

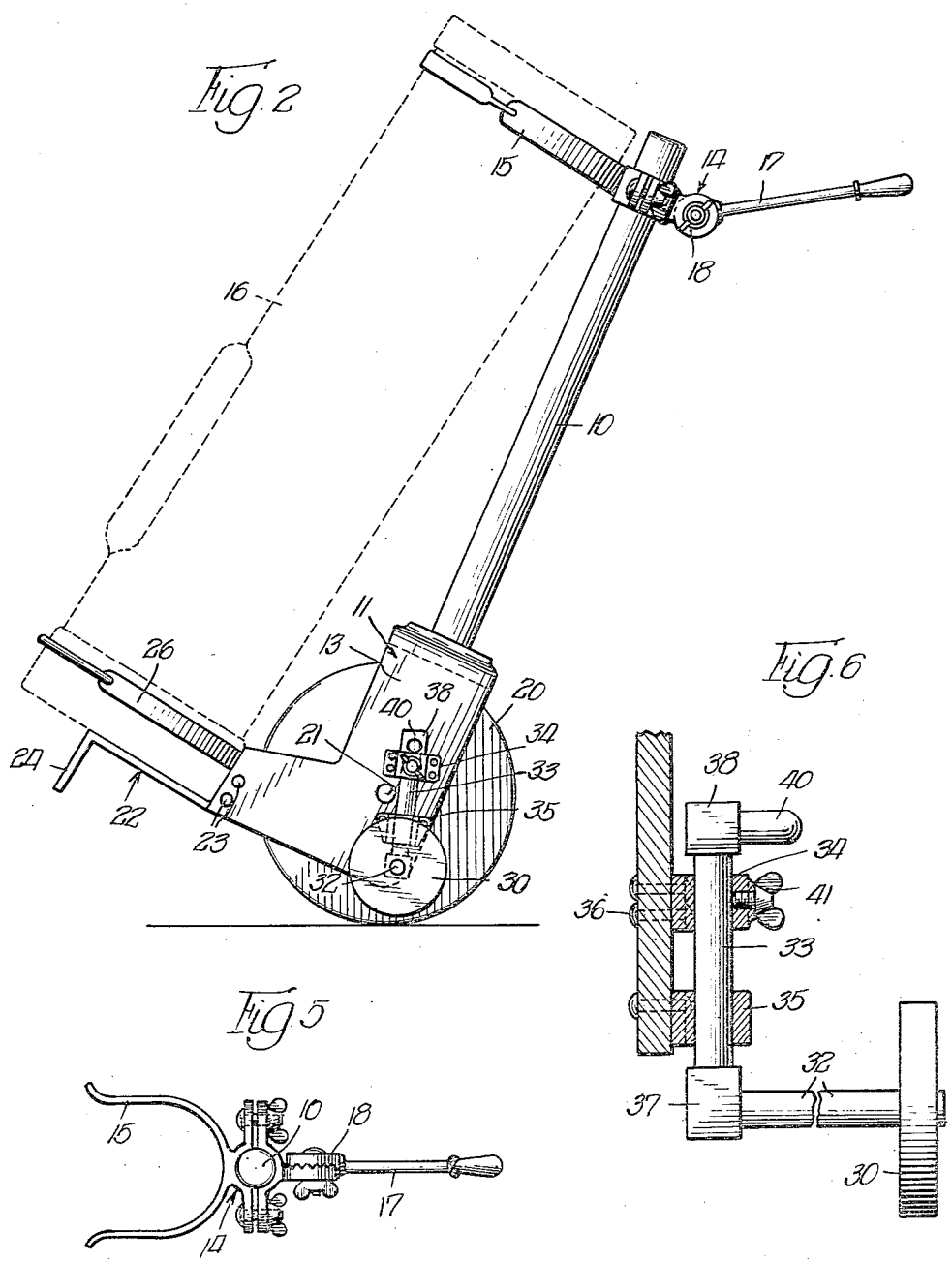

Aug. 20, 1957 G. E. PFISTERER 2,803,469
COLLAPSIBLE GOLF CART
Filed Dec. 14, 1954 3 Sheets-Sheet 3
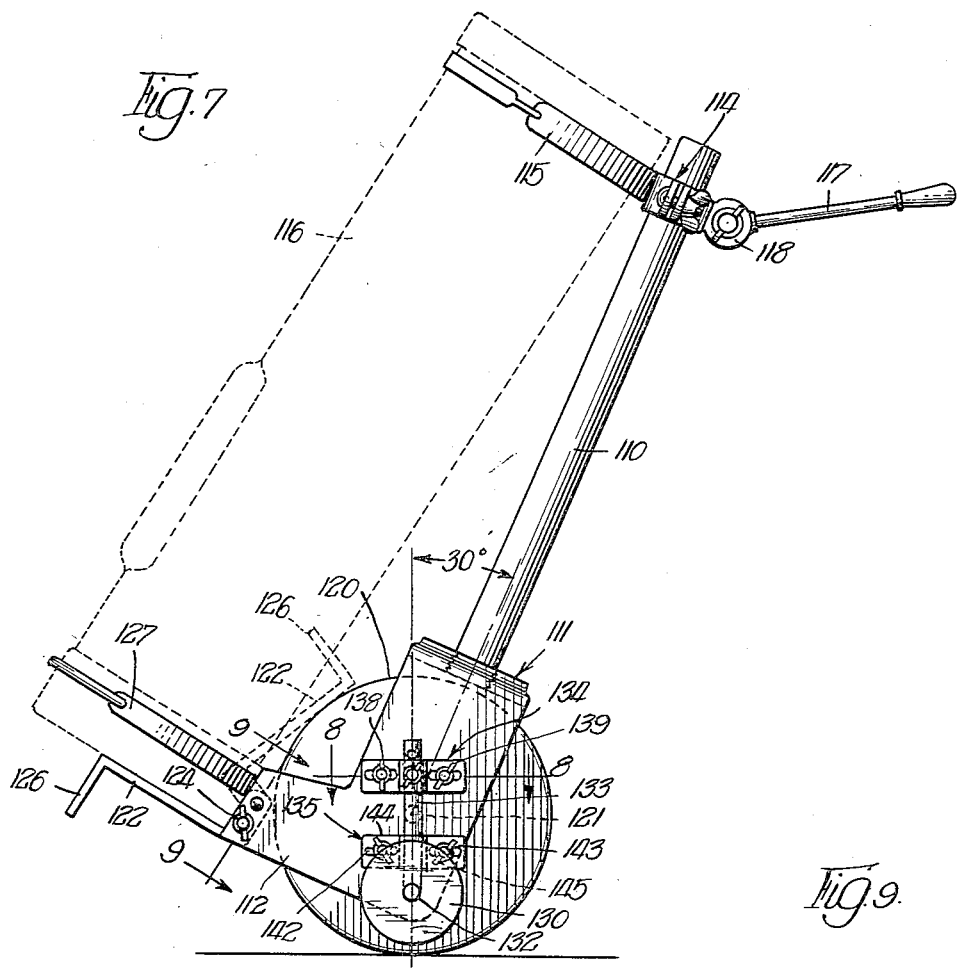
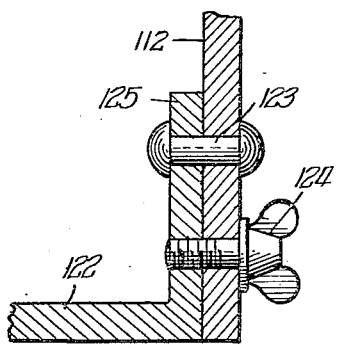
INVENTOR.
George E. Pfisterer,
BY United States Patent Office 2,803,469
Patented Aug. 20, 1957

2,803,469

COLLAPSIBLE GOLF CART

George E. Pfisterer, Evanston, Ill.

Application December 14, 1954, Serial No. 475,190

9 Claims. (Cl. 280—38)

The invention relates to mechanical caddies in the form of golf carts and has reference more particularly to a collapsible golf cart consisting essentially of a bag carrying frame supported for rolling movement by a center wheel and by auxiliary side wheels.

An object of the invention resides in the provision of a collapsible golf cart characterized by an inverted U-shaped member for journalling the center wheel of the cart, the said member additionally providing a supporting element for the auxiliary side wheels.

A further object of the invention is to provide a golf cart having an inverted U-shaped member for journalling the center wheel of the cart between the depending legs of the member and for supporting the axles of the auxiliary side wheels from the exterior surface of the leg members, respectively, and wherein the cart is rendered collapsible by the provision of improved means pivotally supporting the axles for the side wheels in a manner permitting vertical adjusting movement thereof in addition to permitting horizontal swinging movement of the axles for collapsing the side wheels to the rear of the cart.

Another object of the invention is to provide a golf cart of the center wheel type and which is maintained in balance during rolling movement by auxiliary side wheels considerably smaller in size than the center wheel and which are normally elevated above the ground engaging contact of the center wheel, although said side wheels may be lowered when desired so that the ground contact for all three wheels will be in horizontal alignment.

Another object of the invention is to provide a golf cart frame having an inverted U-shaped member for supporting the center wheel and also the auxiliary side wheels of the cart and wherein a bag supporting shelf is additionally secured to the member, said shelf being fixed to the member or pivoted to the member, in which latter case the shelf can be folded back for collapsing purposes.

Another object of the invention is to provide a collapsible golf cart having a center wheel, a pair of auxiliary side wheels, and a forwardly disposed bag supporting shelf which in combination with the center wheel provides a three-point ground supporting contact for maintaining the cart and bag in approximately vertical position.

A further object is to provide a collapsible cart which is light in weight, simple to manufacture, and easy to use in the transporting of golf clubs on a golf course.

With these and various other objects in view, the invention may consist of certain novel features of construction and operation, as will be more fully described and particularly pointed out in the specification, drawings and claims appended hereto.

In the drawings which illustrate an embodiment of the device and wherein like reference characters are used to designate like parts—

Figure 1 is a side elevational view of the present golf cart with the bag being shown in dotted lines, and which illustrates the ground supported position of the cart;

Figure 2 is a side elevational view of the golf cart and bag of Figure 1, the same being shown in tilted rolling position such as it will generally assume when the cart is being pushed or drawn by the operator;

Figure 3 is a front elevational view of the golf cart frame, the same embodying the improved features of the invention;

Figure 4 is a sectional view taken along line 4—4 of Figure 3;

Figure 5 is a plan view showing conventional structure in the form of an adjustable ratchet type handle and bracket means for holding the top of the golf bag;

Figure 6 is a sectional view showing the rotatable supporting structure for the axles of the auxiliary side wheels;

Figure 7 is a side elevational view showing a golf cart embodying modified structure coming within the invention;

Figure 8 is a detail view illustrating the structure for permitting adjustment of the supporting shafts for the auxiliary side wheels; and Figure 9 is a sectional view taken along line 9—9 of Figure 7.

Referring to the drawings and particularly Figures 1, 3 and 4, the golf cart selected for illustrating the present invention essentially consists of a frame including a standard 10, to the lower end of which is suitably secured the casting 11. The said casting or member 11 is U-shaped when viewed in front elevation and the member is inverted so that the spaced legs of the member, identified by numerals 12 and 13, Figure 3, depend downwardly. A bracket 14 is fixed to the upper end of the standard 10 and said bracket provides the resilient and adjustable yoke 15 for receiving the top end of the golf bag 16, and said bracket additionally provides the ratchet type handle 17 which is conveniently locked in adjusted position by the wing nut 18.

The member 11, which may be cast of aluminum or any other suitable metal, journals the main wheel 20 by means of the shaft 21. Accordingly, the main wheel 20 is located centrally of the frame when viewed in both front and side elevation, as is evident from Figures 1 and 3. A bag supporting shelf 22 is suitably fixed by means of rivets 23 to the member 11 at the forward end of the member and said shelf is provided with spikes 24 which engage the ground to support the frame and the bag in a substantially vertical position. As best shown in Figure 4, the shelf 22 is apertured at 25 for lightness and its width increases slightly in a forward direction so that the spikes 24 have a maximum spaced relation. The spaced spikes 24 in combination with the main wheel 20 provide a three-point ground support for the frame, whereby the frame may be stationarily positioned with the standard and bag being disposed substantially vertical. The lower end of the golf bag, which is supported by shelf 22, may be releasably held to the shelf or to the casting 11 by a combination spring strap and resilient cord identified by numeral 26.

During rolling movement of the golf cart the frame will be tilted when viewed in side elevation, as disclosed in Figure 2, and the angle of tilt may vary from thirty to forty-five degrees, depending on the habits and convenience of the operator in this respect. The frame and the bag are maintained in a substantially vertical position when viewed in front elevation, Figure 3, by means of auxiliary side wheels 28 and 30, which, in combination with the main or center wheel 20 may provide a three-point ground engaging contact. The ground contact of the center wheel and one or both of the side wheels is automatic when it is required to maintain the vertical equilibrium of the cart. In accordance with the invention, the auxiliary side wheels 28 and 30 are elevated a slight distance above the ground contact for center wheel 20. This adds to the ease of rolling movement since the center wheel 20 will at all times engage the ground, with the auxiliary side wheels contacting the ground at certain times due to the nature of the terrain and other times due to the lateral tilting or wobble of the cart. Thus the main wheel 20 and one of the auxiliary wheels will generally have contact with the ground, although the center wheel or all three wheel may engage the ground during rolling movement of the cart.

Each auxiliary side wheel is journalled for rotation by an axle such as 31 for wheel 28 and 32 for wheel 30. The supporting means for the axles is best shown in Figure 6, the same essentially consisting of a shaft journalled for rotation by brackets fixed to the exterior surface of the leg members, respectively. Since the supporting mechanism is identical for both axles, the same will be described in connection with axle 32 which journals the side wheel 30, the structure being shown in detail in Figure 6. The shaft 33 is mounted for rotation by means of the brackets 34 and 35, the said brackets being suitably fixed to their particular leg by means of the rivets such as 36. Whereas, bracket 34 is located above the journalling shaft 21 for the center wheel 20, it will be seen that bracket 35 is located below the journalling shaft 21. It will also be observed that the brackets are so disposed as to position the shaft 33 at an inclination with respect to the vertical and which may vary from approximately thirty to forty-five degrees. As a result of the angular disposition of shaft 33 the said shaft is disposed substantially vertically when the cart is tilted for rolling movement as illustrated in Figure 2. The connecting means between the axle 32 and the shaft 33 may consist of the metal block 37. It is entirely feasible to effect said connection by welding the axle 32 to shaft 33, or other means may be employed as a substitute for the block. A second block such as 38 may be fixed to the top projecting end of shaft 33 and the handle 40 is conveniently secured to this block.

As a result of the rotatable mounting of the shafts 33 on the respective sides of the member 11, it will be understood that the auxiliary side wheels 28 and 30 can be bodily oscillated from a laterally extended position, as shown in full lines in Figure 4, to a rear collapsed position as illustrated by the dotted lines of said figure. To effect this movement of the auxiliary side wheels the operator will first of all release the wing nuts 41 having threaded relation in its respective bracket 34. With the wing nuts released the shaft 33 can now be rotated, the action being facilitated by the handles 40 which are selectively grasped by the operator and oscillated to rotate its shaft 33 and in turn oscillates its particular axle and auxiliary side wheel. It is contemplated that the shafts 33 will be provided with flat portions for coaction with their respective wing nut 41. The flat portions on each shaft will be angularly disposed approximately ninety degrees so that the axles and their auxiliary side wheel can be locked by the wing nut in either a right-angled lateral extended position or in a rear collapsed position.

It is desirable to provide for limited vertical adjustment of the shafts 33 in order that the elevated position of the auxiliary side wheels may be varied to suit the desires of the operator as different terrain is encountered on different golf courses or on the same course. Accordingly, as shown in Figure 6, it will be seen that the shafts 33 extend a short distance above and below their journalling brackets 34 and 35, respectively. For normal operation the auxiliary side wheels may be elevated approximately one-fourth inch above the ground engaging contact for the main wheel 20. However, this distance is adjustable as described and it is entirely possible to elevate the auxiliary side wheels so as to space them from a quarter inch to a full inch above the ground, when the cart is tilted for rolling movement as shown in Figure 2.

Referring to the modification shown in Figures 7, 8 and 9, it will be observed that the frame essentially consists of the upright standard 110 to the lower end of which is suitably secured the U-shaped casting 111 having the spaced legs 112. The bracket 114 is fixed to the upper end of the standard 110 and said bracket provides the resilient yoke 115 for receiving the top end of the golf bag 116. Said bracket additionally provides the ratchet type handle 117 which is conveniently locked in adjusted position by the wing nut 118.

The member 111 receives the main wheel 120 of the cart, said main wheel being journalled by shaft 121. Accordingly, the main wheel is located centrally of the frame when viewed in both front and side elevations, and as described in connection with the modification of Figures 1 and 2, the main wheel constitutes the principal ground engaging support for the cart and which at all times will have contact with the ground. The bag supporting shelf 122 is pivotally secured to member 111 by the rivet 123.

The said shelf is locked in forward extended position by means of the wing nuts 124 which have threaded relation with the legs 112, respectively, and with the adjacent ear 125 provided by the shelf.

This pivotal arrangement for the shelf provides for foldability of the said shelf in order that the present frame may be collapsed to a minimum size. This requires removal of the bag and upon retraction of the wing nut 124 to release the shelf, the same can be folded back into contact with the main wheel. The shelf 122 is formed with the forward spikes 126 for ground contact. The lower end of the golf bag 116 is releasably held to the shelf or to member 111 by a combination spring strap and resilient cord identified by numeral 127.

Side wheels such as 130 constitute elements of the present cart and these wheels are suitably journalled by means of an axle such as 132. The axles 132, respectively, may be formed integral with or are otherwise secured to individual shafts identified by numeral 133, and, as previously described, each shaft is mounted for rotation on its respective leg of the member 111. Said mounting means for each shaft consists of an upper bracket 134 and a lower bracket 135. Each bracket is mounted in a manner permitting lateral adjustment so that its particular shaft 133 can be adjusted to vary its angle of inclination with respect to the longitudinal center of the member 111. As shown in detail in Figure 8, the bracket is formed with a pair of elongated slots such as 136 and 137, the same extending approximately horizontally and which are adapted to receive the wing nuts 138 and 139, respectively, which have threaded relation with member 111. The shaft 133 is received by the circular portion 140 of the bracket 134 and the wing nut 141 has threaded relation with the bracket so as to bear again flat portions on shaft 133, whereby to lock the shaft with its auxiliary side wheel in a lateral extended position or in a rear collapsed position. The lower bracket 135 is similar in all respects to upper bracket 134, the same having a pair of horizontal slots therein such as 142 and 143 and which receive the wing nuts 144 and 145, respectively.

The adjustability of brackets 134 and 135 makes it possible for the operator to vary the inclination of shaft 133 with respect to the longitudinal center of the member 111 and wherein the inclination is such as to dispose the auxiliary side wheel rearwardly and which may vary from approximately thirty to forty-five degrees. It will also be observed that the shaft 133 intersects the axis for the main wheel 120 and that said shaft is disposed substantially vertically when the frame is tilted, as shown in Figure 7, for rolling movement of the cart in order to transport bag 116 from place to place on the golf course.

In this modification, as described in connection with the cart of Figures 1 and 2, the auxiliary side wheels 130 are elevated a slight distance above the ground engaging contact of said main wheel 120. This provides for easier rolling movement of the cart and allows only limited wobbling from said to side. The center wheel will contact the ground at all times and upright equilibrium of the cart is maintained by the side wheels so that as regards said wheels either one, two or all three wheels will at times engage the ground.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. In a caddie cart, a frame including an upright standard, an inverted U-shaped member fixed to the lower end of the standard, a handle pivoted to the upper end of the standard, a center wheel disposed within the depending legs of the member and journalled thereby, a pair of auxiliary side wheels, one being located on each side of the member, an axle for each side wheel and which journals the same for rotation, supporting means for each axle having rotatable securement to its respective leg of the member, whereby each axle and its auxiliary side wheel may have oscillating movement from a lateral extended position to a rear collapsed position and return, and a bag supporting shelf fixed to the depending legs of the member and disposed forwardly of the same.

2. In a caddie cart, a frame including an upright standard, a U-shaped member fixed to the lower end of the standard with the member in inverted position so that the legs thereof depend downwardly, a relatively large center wheel disposed within the depending legs of the member and being journalled thereby, a pair of auxiliary side wheels smaller in diameter than the center wheel and located on respective sides of the member, an axle for each side wheel and on which the wheel is journalled, a supporting shaft for each axle, brackets fixed to each side of the member for mounting the shafts for rotation on a substantially vertical axis when the cart is supported in an upright position, said brackets and shafts being so constructed and arranged as to permit vertical adjustment of the shafts, whereby the auxiliary side wheels may be oscillated to and from extended and collapsed positions, and may also be adjusted vertically to vary the distance between the side wheels and the ground engaging contact for the center wheel.

3. A caddie cart as defined by claim 2, additionally including a bag supporting shelf fixed to the depending legs of the member and disposed forwardly of the same, said shelf having a pair of spaced spikes for contact with the ground, whereby the cart can be vertically supported by reason of a three-point ground contact including the spaced spikes and the center wheel.

4. In a caddie cart, a frame including an inverted U-shaped member providing a pair of spaced depending legs, a standard fixed to said member and extending above the same in substantial alignment therewith, a center wheel disposed within the depending legs of the member and journalled thereby, a pair of auxiliary side wheels, said side wheels being located in spaced relation on respective sides of the member, an axle for each side wheel and which journals the wheel for rotation, supporting means for each axle including a longitudinally disposed shaft to which the axle is fixed so that rotation of the shaft will effect swinging movement of the axle and wheel, journalling means for each shaft including brackets fixed to the legs respectively and which mount the shafts for rotation, whereby each shaft, its axle and its auxiliary side wheel may be oscillated to and from a laterally extended position for the wheel and a collapsed position therefor, said brackets and shafts being so constructed and arranged as to permit vertical adjustment of the shafts for varying the distance between the side wheels and the ground engaging contact for the center wheel, and means provided by the member for supporting the golf bag to be transported by the cart, said means providing ground engaging elements which are located forwardly of the center wheel.

5. In a caddie cart, a frame including an upright standard, a U-shaped member fixed to the lower end of the standard with the member in inverted position so that the legs thereof depend downwardly, a relatively large center wheel disposed within the depending legs of the member and being journalled thereby, a pair of auxiliary side wheels smaller in diameter than the center wheel and located on respective sides of the member, an axle for each side wheel and on which the wheel is journalled, a supporting shaft for each axle, brackets fixed to each leg of the member for respectively mounting the shafts for rotation, the said brackets and shafts being angularly disposed in a rearward direction from approximately thirty to forty-five degrees with respect to the longitudinal center of the inverted U-shaped member, whereby when the cart is tilted rearwardly during rolling movement of the same the brackets and shafts will be disposed substantially vertically.

6. In a caddie cart as defined by claim 5, wherein at least one of the brackets fixed to each leg of the member are disposed below the transverse journalling axis for the large center wheel, and wherein said brackets are adjustably fixed to their respective side members so as to permit adjustment of the brackets on an arc the center of which substantially coincides with the journalling axis of said large wheel.

7. In a caddy cart, a frame including an upright standard, a U-shaped member fixed to the lower end of the standard with the member in inverted position so that the legs thereof depend downwardly, a relatively large center wheel disposed within the depending legs of the member and journalled thereby, a pair of auxiliary side wheels smaller in diameter than the center wheel and located on respective sides of the member, supporting and journalling means for the side wheels respectively including an axle for each wheel and a shaft for supporting each axle, each axle and shaft having a right angle relation, bracket means fixed to each side of the member for mounting the shafts respectively and in a manner permitting oscillating movement of the shafts and thus oscillating movement of the axles and auxiliary side wheels, whereby the auxiliary side wheels may be moved to and from extended and collapsed positions, and a manually manipulatable locking element carried by each bracket means for holding its shaft in either of said adjusted positions.

8. In a caddy cart, a frame including an inverted U-shaped member, a wheel disposed within the depending legs of the member and journalled thereby, a pair of auxiliary side wheels, one being located on each side of the member, an axle for each side wheel and which journals the same for rotation, supporting means for each axle including a shaft to which the axle is fixed so as to have a right angle relation therewith, supporting means for each shaft including brackets fixed to the legs respectively and which mount the shafts for rotation, whereby each shaft, its axle and its auxiliary side wheel may be oscillated to and from a lateral extended position for the wheel and a collapsed position therefor, and means provided by the member for supporting the golf bag to be transported by the cart, said means providing ground engaging elements and which are located forwardly of the center wheel.

9. In a caddy cart, a frame including an upright standard, a U-shaped member fixed to the lower end of the standard with the member in inverted position so that the legs thereof depend downwardly, said legs each having the shape of a reversed L and thereby providing a longitudinal portion and a forwardly extending portion, a relatively large center wheel disposed within the depending legs of the member and being journalled by the longitudinal portions thereof, a pair of auxiliary side wheels smaller in diameter than the center wheel and located on respective sides of the member, an axle for each side wheel and on which the wheel is journalled, supporting means for each axle having securement to the longitudinal portion of the depending legs respectively for supporting the axles from said member, each supporting means being so positioned that the axle thereof and the axle of the center wheel are located in approximately the same vertical plane when the cart is tilted rearwardly during rolling movement of the same, and means secured to the forwardly extending portion of the legs for supporting a golf bag to be transported by the cart.

References Cited in the file of this patent

UNITED STATES PATENTS

| | | |
|---|---|---|
| 558,815 | Kampf | Apr. 21, 1896 |
| 1,691,390 | Hanan | Nov. 13, 1928 |
| 1,960,862 | Baldwin | May 29, 1934 |
| 2,613,952 | Lannon | Oct. 14, 1952 |